Figure 1:
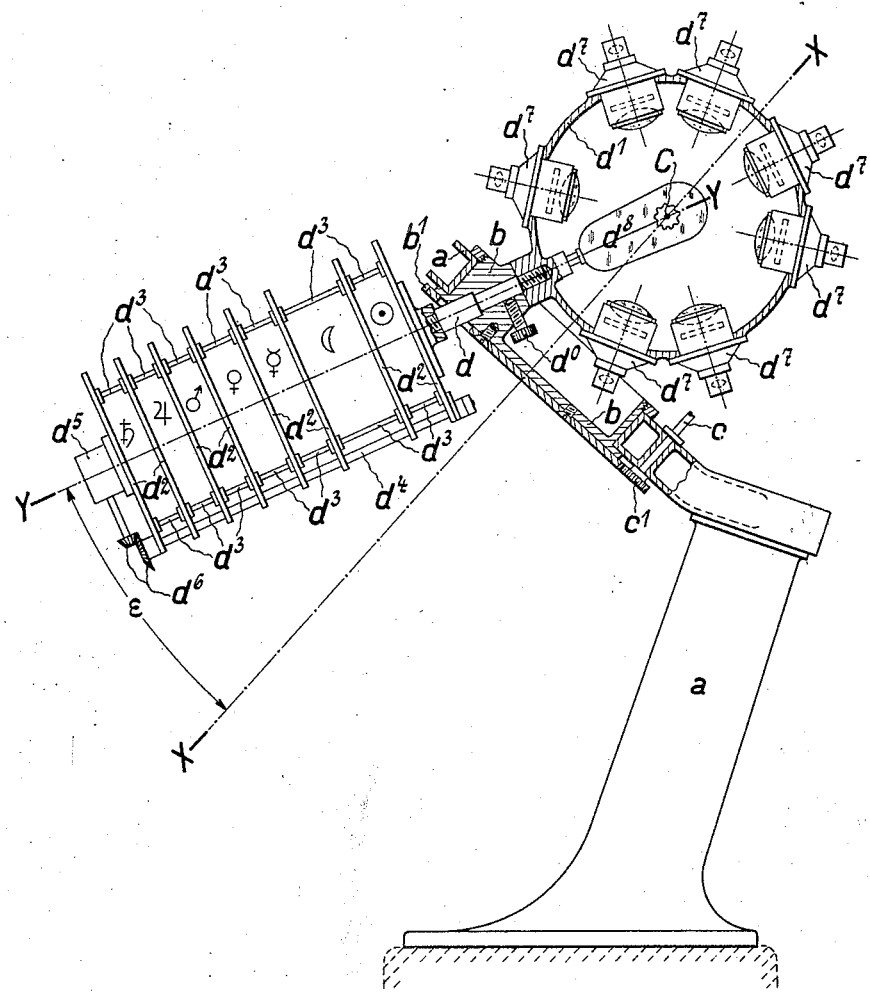

Feb. 8, 1927. 1,616,736
W. BAUERSFELD
DEVICE FOR PROJECTING STARS
Filed Oct. 13, 1923  4 Sheets-Sheet 1

Inventor:
Walther Bauersfeld.

Inventor:
Walter Bauersfeld.

Patented Feb. 8, 1927.

1,616,736

UNITED STATES PATENT OFFICE.

WALTHER BAUERSFELD, OF JENA, GERMANY, ASSIGNOR TO FIRM OF CARL ZEISS, OF JENA, GERMANY.

DEVICE FOR PROJECTING STARS.

Application filed October 13, 1923, Serial No. 668,446, and in Germany October 16, 1922.

The present invention relates to a device for projecting stars on a spherical projection screen.

With a view to rendering visible, on the one hand, upon this projection screen the fixed stars to such an extend as they are visible at the station of the device, several projection devices are so disposed as to be rotatable about an axis, containing the centre of the spherical screen and being parallel to the axis of the earth, and that their objectives are grouped round a source of light which lies in this centre and is common to all projection devices.

In order to illustrate, on the other hand, upon this projection screen the motions of a body of the solar system moved relatively to the earth, viz, of a planet or the sun or the moon in such a way as observed at the station of the device, an arrangement is provided containing a carrier which is disposed rotatably about an axis, containing the centre of the spherical projection screen and being parallel to the axis of the earth, and in which carrier two members are movably disposed relatively to each other, to which members a projection device is coupled in such a way that its axis is always parallel with the connecting line of a definite point of the one member with a definite point of the other member. The definite point of the one member of the earth and that of the other member corresponds to the body of the solar system moved relatively to the earth, the motion of which body is to be illustrated.

In order to simplify the said device as much as possible, let it be assumed that each body of the solar system moves on a circle which lies eccentrically relative to that star about which the body rotates.

Supposing this assumption, at least the one of those two members is guided on an orbit, whose centre lies outside a straight line which has such an invariable position relatively to the said carrier that it contains the centre of the spherical projection screen and is inclined to the said axis of rotation of the carrier by that angle (23½°) which the ecliptic forms with the equator.

If only the one of those two members be guided on an orbit, it is possible to illustrate the motion of the sun or the moon relatively to the earth by rigidly disposing the other of those two members on the said carrier in such a way that the said connecting line of both members always intersects the said straight line. If both members be guided on orbits, it is possible to illustrate the motion of a planet relatively to the earth.

If it be desired to illustrate the motions of the moon or of a planet moved relatively to the earth, one is obliged, if importance be attached to an exact reproduction of the orbit, to consider the fact that the orbits of these celestial bodies are inclined to the ecliptic. For this purpose the orbit on which that of those two members is guided, which corresponds to one of these celestial bodies is inclined to that straight line by the complement of that angle which the orbit of this celestial body forms with the ecliptic.

In order to demonstrate the motions of the moon as true to nature as possible, it is also required to consider the revolution of the nodes and of the apsides. For this purpose the orbit on which the one of those members is guided, which corresponds to the moon, is, on the one hand, disposed rotatably about the said straight line and, on the other hand, about an axis which is perpendicular to this plane in the point of intersection of that straight line with the plane of the orbit.

Finally it has to be taken into consideration that the bodies of the solar system moved relatively to the earth do not uniformly move on their orbits but that with respect to their motion the second Kepler law holds good. The motion of the sun and the planets, corresponding to this law, can be attained with fair approximation if the said device be modified in the following way.

On the said carrier a link is rotatably supported in such a way that its axis of rotation is perpendicular to the plane of the orbit of the celestial body in that point in which this plane is intersected by that straight line. The link contains a radial slit in which engage two pivots which are parallel to the axis of rotation of the link. The one of these two pivots is rigidly connected to an arm supported on that carrier which arm serves for actuating the member guided on the orbit of the celestial body and is supported rotatably about an axis which is parallel to the axis of rotation of the link and contains the centre of the orbit. The other of these two pivots is fixed on a driving wheel (e. g. a toothed wheel), rotatably supported on that carrier or on a carrying arm, rigidly connected to this wheel, in such a way that its distance from the axis of rotation of the wheel is equal to the distance of the first pivot from the axis of rotation of the arm. Thereby, this wheel has such a position relatively to the said carrier that its axis of rotation is parallel to that of the link and lies with the axes of rotation of the link and of the arm in one and the same plane in such a way that the axis of rotation of the arm lies between that of the link and that of the wheel and is equidistant from each of these two axes of rotation.

The above described device may be constructed in exactly the same way if the representation of the motion of the moon, corresponding to the second Kepler law, be concerned, provided that the revolution of the nodes and of the apsides is not to be considered. If, however, this revolution is to be taken into consideration, the link, the arm and the wheel must not be supported directly on the said carrier. For the rest the connexion between these three parts remains unchanged.

With a view to obtaining a structure as compact as possible it is advisable, if only one of those two members be guided on an orbit, whilst the other member is rigidly disposed on that carrier, to choose the position of the centre of the orbit relatively to the said straight line and the adjustment of the movable member on the orbit in such a way that the direction of the connecting line of both members, as viewed from the fixed towards the movable member, agrees with the direction of the axial ray, advancing from the source of light of the projection device coupled to the two members.

For the same reason it is advisable, if in the other case each of those two members be guided on an orbit, to choose the position of the centres of both orbits relatively to that straight line and the adjustment of each of both members on the appertaining orbit in such a way that the direction of the connecting line of the two members, as viewed from that nearest to the straight line towards the remote member, agrees with the direction of the axial ray, advancing from the source of light of the projection device coupled to both members.

The annexed drawing shows a constructional example of a device according to the invention which serves for projecting the fixed stars, the sun ($\odot$), the moon ($\mathbb{C}$) and the planets Mercury ($\xi$), Venus ($\varphi$), Mars ($\delta$), Jupiter ($\mathcal{U}$) and Saturn ($\hbar$) upon a spherical projection screen and to illustrate the motion of these celestial bodies relatively to the earth on this projection screen in such a way as perceived from a certain definite point of the earth ($\oplus$).

Figure 2:
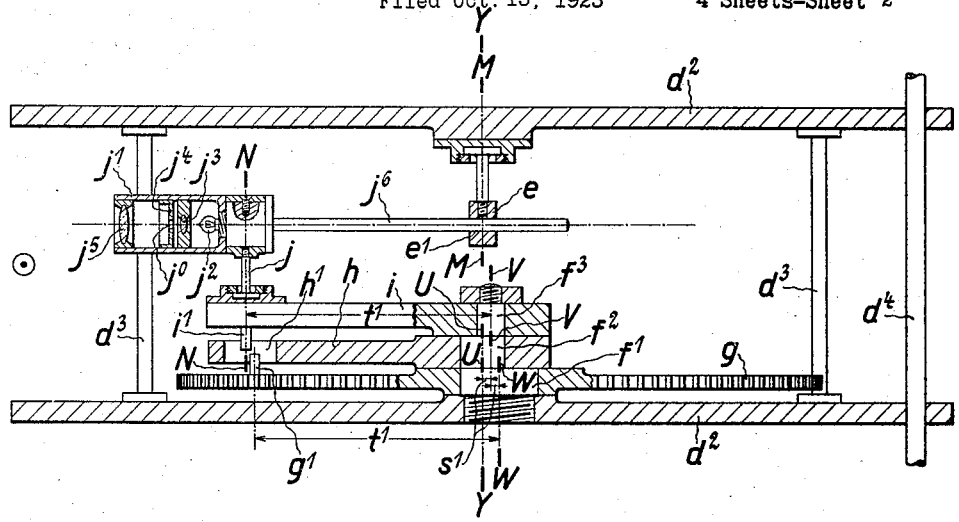
Figure 3:
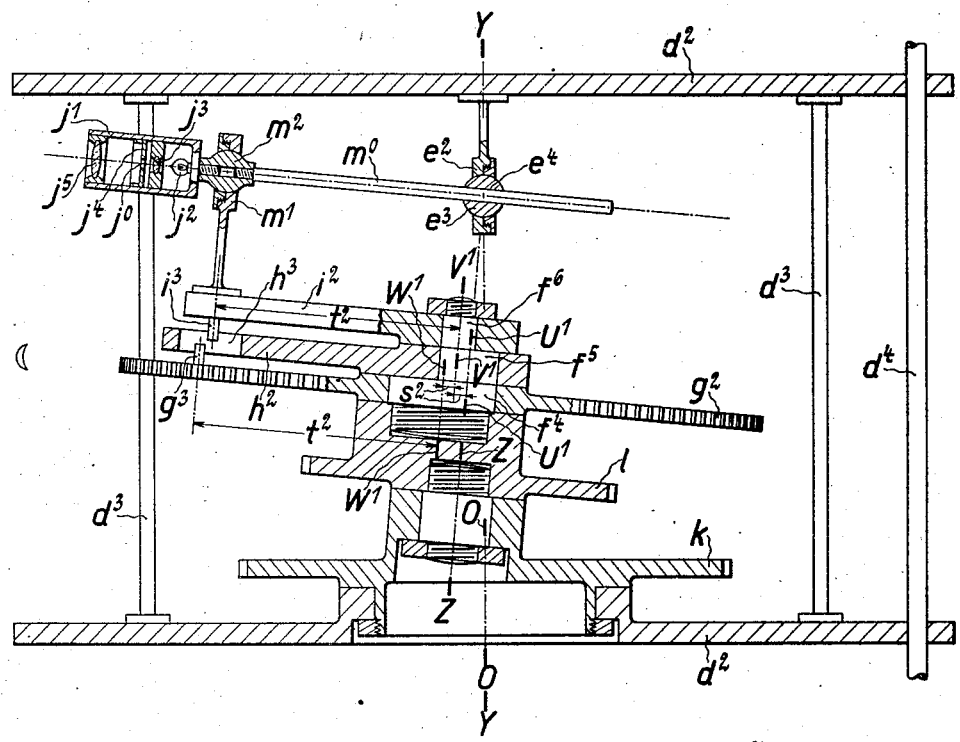
Figures 4, 5:
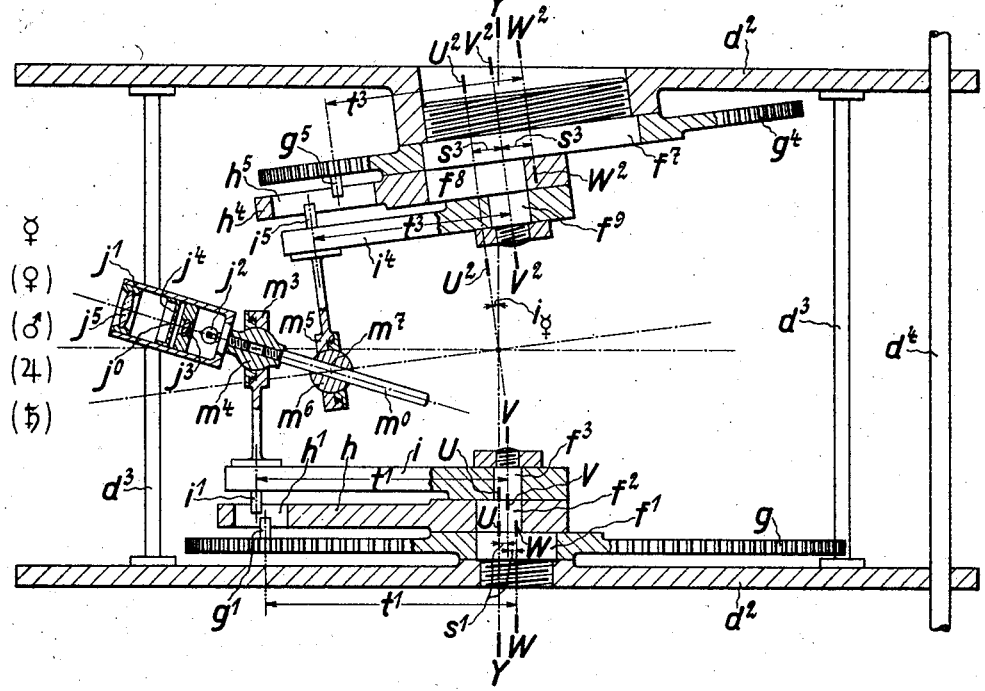

Fig. 1 shows the device in elevation, partly as a front view, partly in section. In this figure the mechanisms for producing the motion of the parts requisite for the projection of the celestial bodies $\odot$, $\mathbb{C}$, $\xi$, $\varphi$, $\delta$, $\mathcal{U}$ and $\hbar$ have for clearness' sake been left out for the most part and only the appertaining astronomical sign is inscribed at the place where the corresponding mechanisms must be fitted. Figs. 2 to 4 show a longitudinal section each, viz, Fig. 2 a section through the mechanism for producing the motion of the sun, Fig. 3 a section through the mechanism for producing the motion of the moon and Fig. 4 a section through one of the mechanisms for producing the motion of Mercury, Venus, Mars, Jupiter, or of Saturn; by means of the astronomical signs inscribed in Figs. 2 to 4 the connexion with Fig. 1 is established. Fig. 5 diagrammatically shows in a plan elevation the relative position of the parts requisite for the projection of the sun, Fig. 6 the corresponding for Mercury and Venus respectively, and Fig. 7 for Mars, and Jupiter or Saturn respectively.

On a standard $a$ there is supported rotatably about an axis X—X a carrying body $b$ which can be actuated by a toothed gearing, whose one wheel $b^1$ is rigidly connected to the carrying body $b$ and whose other wheel $c^1$ is fitted on a shaft $c$, which is rotatably supported on the standard $a$ and parallel to the axis of rotation X—X and which is assumed to be actuated by a motor not shown in the drawing. In the carrying body $b$ there is supported a shaft $d$ rotatably about an axis Y—Y, coinciding with its axis, which embraces with the axis of rotation X—X an angle $\epsilon = 23\frac{1}{2}°$, i. e. that angle formed by the ecliptic with the equator. The shaft $d$ can be clamped in the carrying body $b$ by means of a screw $d^0$. It is, on the one hand, rigidly connected to a casing $d^1$ of the shape of a hollow sphere in such a way that the centre of the sphere C lies at the point of intersection of the axes of rotation X—X and Y—Y. On the other hand on the shaft $d$ there is fixed a carrier consisting of eight plates $d^2$, perpendicular to the axis Y—Y and rigidly connected to each other by bolts $d^3$. On all plates is supported a shaft $d^4$ parallel to the axis of rotation Y—Y. This shaft $d^4$ can be actuated by a motor $d^5$, only diagrammatically shown in the drawing, by means of a pair of bevel wheels $d^6$. On the casing $d^1$ thirty-one projection apparatus $d^7$, of which only seven are visible in the drawing and each of which serves for projecting a part of the fixed stars, are fixed in such a way that their axes intersect at the centre of the sphere C. All projection apparatus $d^7$ have conjointly a glow lamp $d^8$ disposed on the casing $d^1$, the filaments of which glow lamp surround the centre of the sphere C.

The following is to describe the device for projecting the sun (vide Fig. 2) which is assumed to be disposed in the space denoted by ☉ and delimited by two plates $d^2$ (vide Fig. 1). On the one of these two plates $d^2$ a guide-body $e$ is supported rotatably about an axis M—M coinciding with the axis of rotation Y—Y of the shaft $d$ in which guide-body a cylindrical bore $e^1$ is so disposed that its axis perpendicularly intersects the axis of rotation M—M. A pivot containing three cylindrical parts $f^1$, $f^2$ and $f^3$, which lie eccentrically with one another, is screwed to the other one of these two plates $d^2$. The axis of the part $f^1$ is denoted by W—W, that of the part $f^2$ by U—U and that of the part $f^3$ by V—V. These three axes have such a position that they lie in a plane containing the axis of rotation M—M, that furthermore the axis U—U coincides with the axis of rotation M—M and that the axis V—V lies between the axes U—U and W—W and has from each of these two axes a distance $s^1$, corresponding to the linear eccentricity of the orbit of the earth. On the part of the pivot $f^1$ is rotatably disposed a toothed wheel $g$ which by means of a gear (not shown in the drawing) is assumed to be so coupled to the shaft $d^4$ that, on the latter and the carrying body $b$ being actuated each by the appertaining motor, the time during which the carrying body $b$ makes a complete revolution about the axis X—X, is to the time, during which the toothed wheel $g$ makes a complete rotation about the axis W—W, as a sidereal day is to a sidereal year. The toothed wheel $g$ contains a pivot $g^1$, whose axis has a distance $t^1$ from the axis W—W of the part of the pivot $f^1$, which is to the said distance $s^1$ as the radius of the orbit, which may approximately be substituted for the ecliptic orbit of the earth, is to the linear eccentricity of the orbit of the earth. On the part of the pivot $f^2$ is easily rotatably disposed a link $h$ which is provided with a slit $h^1$, directed through the axis U—U, in which slit engages the pivot $g^1$, so that with a rotation of the toothed wheel $g$ a rotation is imparted to the link $h$. In the slit $h^1$ engages at the same time a second pivot $i^1$ which is rigidly connected to an arm $i$, easily rotatably disposed on the part of the pivot $f^3$ in such a way that its axis has the said distance $t^1$ from the axis V—V of the part of the pivot $f^3$. The above described arrangement serves for imparting to the arm $i$ with the pivot $i^1$ such an unequal motion that the second Kepler law is fulfilled. With a uniform motion of the toothed wheel $g$ this desired unequal motion is almost completely attained. On the arm $i$ is supported rotatably about an axis N—N, coinciding with the axis of the pivot $i^1$, a holder $j$ on which a projection apparatus $j^1$ is fixed in such a way that its optical axis lies in that plane which is described by the axis of the cylindrical bore $e^1$ with a rotation of the guide-body $e$ about its axis of rotation M—M. The projection apparatus $j^1$ contains a glow lamp $j^2$, a condenser $j^3$, a stop $j^4$ provided with a small aperture $j^5$ and an objective $j^5$. A guide-bar $j^6$, which is so connected to the projection apparatus $j^1$ that its axis coincides with the optical axis, is displaceably supported in the bore $e^1$ of the guide-body $e$ and causes, on the toothed wheel $g$ being actuated, a rotation of the projection apparatus about the axis M—M.

The nature of the described device is obvious from Fig. 5 in which the drawing plane is the plane of the ecliptic. The sun is assumed to be found at the point M. Mγ denotes the direction of vision from the sun towards the vernal equinox. The angle γMQ′ = π ☋ indicates the longitudinal of the perihelion Q′ of the orbit of the earth. By tracing on the extension of Q′M beyond M the distance MV′ = $s^1$ and by describing about V′ a circle having a radius $R^1$, equal to the aforesaid distance $t^1$, the same approximately corresponds to the orbit of the earth. By connecting a point P′ of this circle with M, the direction of vision from P′ towards M indicates the direction in which the sun is observed from the earth when the latter is at the point P′. When projecting the sun, the direction of projection should evidently agree with this direction of vision. Reflections render it desirable that the direction in which the sun is seen from the earth be brought about by the viewing from the fixed point M. If the circle corresponding to the orbit of the earth be assumed to be displaced in the direction MQ′ beyond Q′ by $2s^1$, whereby $s^1$ has the above mentioned value and whereby, furthermore, the centre of this circle moves from V′ to V and the longitude of the new perihelion Q, assumes the angular value π ☋ + 180°, and if, in addition, on this displaced circle the earth be assumed to be at that point P, which is at the same distance from the new perihelion Q, as the point P′ from the first-named perihelion Q′, the points P′ and P lie on a straight line through M. Hence the direction of vision from the sun, rigidly disposed at the point M, towards the earth being at the point P agrees with the direction of vision from P′ towards M. Besides, let a distance VW = MV = $s^1$ be traced on VQ′. As also in the following, let it be always assumed that the plane determined by the axis Y—Y and the axis of the shaft $d^4$ (vide Fig. 2) contains the direction of vision from the sun towards the vernal equinox. Hence it follows that the pivot $f^1$, $f^2$, $f^3$, in contrast to the drawing as per Fig. 2, must have such a position relatively to the plate $d^2$ which carries it, that the plane determined by the axes U—U, V—V, and W—W of the parts of the pivots $f^2$, $f^3$ and $f^1$ embraces with that plane the angle π ☿ and that the position of the axes U—U, V—V and W—W corresponds to the position of the points M, V and W in Fig. 5.

The following shall serve as a description of the device for projecting the moon (vide Fig. 3), which is assumed to be disposed in the space denoted by ☾ and delimited by two plates $d^2$ (vide Fig. 1). On the one of these two plates $d^2$ there is fixed the bush $e^2$ of a ball and socket joint, whose ball is denoted by $e^3$, in such a way that the centre of the ball lies on the axis of rotation Y—Y of the shaft $d$. On the other of these two plates $d^2$ is supported rotatably about an axis O—O, coinciding with the axis of rotation Y—Y, a toothed wheel $k$ which is assumed to be so coupled to the shaft $d^4$ by means of a gear (not shown in the drawing) that, on the shaft $d^4$ and the carrying body $b$ being actuated each by the appertaining motor, the time during which the carrying body $b$ makes a complete revolution about the axis X—X is to the time, during which the toothed wheel $k$ makes a complete rotation about the axis O—O, as a sidereal day is to that time during which the nodes of the moon make a complete revolution. On the toothed wheel $k$ there is supported a toothed wheel $l$ rotatably about an axis Z—Z which embraces with the axis of rotation O—O of the toothed wheel $k$ that angle which the orbit of the moon forms with the ecliptic and which contains the centre of the ball $e^3$. This toothed wheel is assumed to be so coupled to the shaft $d^4$ by means of a gear (not shown in the drawing) that, on the shaft $d^4$ and the carrying body $d$ being actuated each by the appertaining motor, the time during which the carrying body $b$ makes a complete rotation about the axis X—X is to the time during which the toothed wheel $l$ makes a complete rotation about the axis Z—Z, as a sidereal day is to that time during which the apsides of the orbit of the moon make a complete revolution, referred to one and the same node of the orbit of the moon. To the toothed wheel $l$ is screwed a pivot which like the pivot $f^1$, $f^2$, $f^3$, contains three cylindrical parts $f^4$, $f^5$, $f^6$, lying eccentrically with each other. The axis of the part $f^4$ is denoted by $W^1$—$W^1$ that of the part $f^5$ by $U^1$—$U^1$ and that of the part $f^6$ by $V^1$—$V^1$. These three axes have such a position that the axis $U^1$—$U^1$ coincides with the axis of rotation Z—Z of the toothed wheel $l$ and that the two other axes $V^1$—$V^1$ and $W^1$—$W^1$ lie in one plane with the axis $U^1$—$U^1$, viz, that the axis $V^1$—$V^1$ lies between the two other axes and has from each of them a distance $s^2$ which corresponds to the linear eccentricity of the orbit of the moon. On the part of the pivot $f^4$ there is easily rotatably disposed a toothed wheel $g^2$ which is assumed to be so coupled to the shaft $d^4$ by means of a gear (not shown in the drawing) that, on the shaft $d^4$ and the carrying body $b$ being actuated each of the appertaining motor, the time during which the carrying body $b$ makes a complete rotation about the axis X—X is to the time during which the toothed wheel $g^2$ makes a complete rotation about the axis $W^1$—$W^1$, as a sidereal day is to a sidereal month. The toothed wheel $g^2$ contains a pivot $g^3$, whose axis has from the axis $W^1$—$W^1$ of the part of the pivot $f^4$ a distance $t^2$, which is to the said distance $s^2$ as the radius of the orbit which may approximately be substituted for the elliptic orbit of the moon, is to the linear eccentricity of the orbit of the moon. On the part of the pivot $f^5$ there is easily rotatably supported a link $h^2$ which is provided with a slit $h^3$, directed through the axis $U^1$—$U^1$, and in which engages the pivot $g^3$, so that with a rotation of the toothed wheel $g^2$ about the axis $W^1$—$W^1$ the link $h^2$ is given a rotation about the axis $U^1$—$U^1$. In the slit $h^3$ engages simultaneously a second pivot $i^3$ which is rigidly connected to an arm $i^2$ easily rotatably disposed on the part of the pivot $f^6$, in such a way that its axis has the said distance $t^2$ from the axis $V^1$—$V^1$ of the part of the pivot $f^6$. The described arrangement is designed to impart to the arm $i^2$ with the pivot $i^3$ such an unequal motion as to fulfil the second Kepler law. With a uniform motion of the toothed wheel $g^2$ this desired unequal motion is fairly well attained. On the arm $i^2$ there is fixed the bush $m^1$ of a ball and socket joint, whose ball is denoted by $m^2$, in such a manner that the centre of the ball lies, on the one hand, on the axis of the pivot $i^3$ and, on the other hand, in a plane perpendicular to the axis Z—Z through the centre of the ball and socket joint $e^2$, $e^3$. To the ball $m^2$ is screwed a projection apparatus $j^1$, containing the same optical parts as that appertaining to the device for projecting the sun, in such a way that its optical axis contains the centre of the ball and socket joint $m^1$, $m^2$. A guide-bar $m^0$, displaceably supported in a bore $e^4$ of the ball $e^3$, is so screwed to the ball $m^2$ that the optical axis of the projection apparatus also contains the centre of the ball and socket joint $e^2$, $e^3$ and, on the shaft $d^4$ being actuated, undergoes a rotation about this centre.

The following shall serve as a description of the device for projecting Mercury (vide Fig. 4) which is assumed to be disposed in the space denoted by ☿ and delimited by two plates $d^2$ (vide Fig. 1). This device contains in the first place various parts which are exactly constructed and disposed as in the device for projecting the sun shown in Fig. 2 and which are thus provided with the same denotations, viz., a pivot, fixed on one of these two plates $d^2$, with three cylindrical parts $f^1$, $f^2$ and $f^3$ lying eccentrically with each other, a toothed wheel $g$ with a pivot $g^1$, a link $h$ having a slit $h^1$ and an arm $i$ with a pivot $i^1$. As to particulars it may be referred to the respective part of the description of Fig. 2. On the arm $i$ there is fixed the bush $m^3$ of a ball and socket joint, whose ball is denoted by $m^4$, in such a way that the centre of the ball lies on the axis of the pivot $i^1$. On the other of those two plates $d^2$ is fixed a pivot which contains three cylindrical parts $f^7$, $f^8$ and $f^9$ lying eccentrically with one another. The axes of these parts of the pivot are denoted in succession by $W^2$—$W^2$, $U^2$—$U^2$ and $V^2$—$V^2$ and have such a relative position as to lie in one and the same plane, whereby the axis $V^2$—$V^2$ lies between the two other axes and has from each of them a distance $s^3$ which corresponds to the linear eccentricity of the orbit of Mercury and which is based upon the same scale as the aforesaid distance $s^1$. The axis $U^2$—$U^2$ of the part of the pivot $f^8$ embraces with the axis $U$—$U$ of the part of the pivot $f^2$ that angle $i^y$, which the orbit of Mercury forms with the ecliptic, and intersects the axis $U$—$U$ in that point in which this axis is intersected by the plane, perpendicular to it and containing the centre of the ball and socket joint $m^3$, $m^4$. On the part of the pivot $f^7$ is easily rotatably supported a toothed wheel $g^4$, which is assumed to be coupled to the shaft $d^4$ by means of a gear (not shown in the drawing) in such a way that, on the shaft $d^4$ and the carrying body $b$ being actuated each by the appertaining motor, the time during which the carrying body $b$ makes a complete rotation about the axis $X$—$X$ is to the time, during which the toothed wheel $g^4$ makes a complete rotation about the axis $W^2$—$W^2$, as a sidereal day is to the sidereal time of revolution of Mercury. The toothed wheel $g^4$ contains a pivot $g^5$, whose axis has from the axis $W^2$—$W^2$ of the part $f^7$ of the pivot a distance $t^3$, which is to the said distance $s^3$ as the radius of the orbit which may approximately be substituted for the elliptic orbit of Mercury, is to the linear eccentricity of the orbit of Mercury. On the part $f^8$ of the pivot there is easily rotatably supported a link $h^4$ which is provided with a slit $h^5$, directed through the axis $U^2$—$U^2$, and in which engages the pivot $g^5$, so that with a rotation of the toothed wheel $g^4$ about the axis $W^2$—$W^2$ the link is given a rotation about the axis $U^2$—$U^2$. In the slit $h^5$ engages simultaneously a second pivot $i^5$ which is rigidly connected to an arm $i^4$, easily rotatably disposed on the part $f^9$ of the pivot, in such a way that its axis has the said distance $t^3$ from the axis $V^2$—$V^2$ of this part of the pivot. The described arrangement is destined to impart to the arm $i^4$ with the pivot $i^5$ such an unequal motion as to fulfil the second Kepler law. With a uniform motion of the toothed wheel $g^4$ this desired unequal motion is nearly attained. On the arm $i^4$ there is fixed the bush $m^5$ of a ball and socket joint, whose ball is denoted by $m^6$, in such a way that the centre of the ball lies on the one hand on the axis of the pivot $i^5$ and on the other hand in that plane perpendicular to the axis $U^2$—$U^2$ which contains the point of intersection of this axis with the axis $U$—$U$. To the ball $m^4$ is screwed a projection apparatus $j^1$, containing the same optical parts as that appertaining to the device for projecting the sun, in such a way that its optical axis contains the centre of the ball and socket joint $m^3$, $m^4$. A guide-bar $m^0$, displaceably supported in a bore $m^7$ of the ball $m^6$, is so screwed to the ball $m^4$ that the optical axis of the projection apparatus also contains the centre of the ball and socket joint $m^5$, $m^6$.

Figure 6:
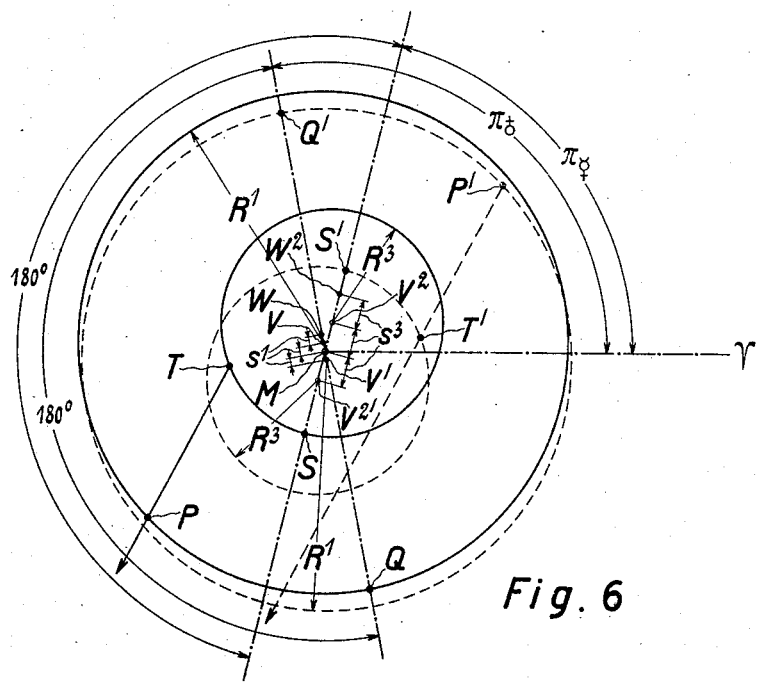

The nature of the described device is obvious from Fig. 6 in which the drawing plane is the plane of the ecliptic. The sun is assumed to be found at the point M. M$\gamma$ denotes the direction of vision from the sun towards the vernal equinox. The angle $\gamma MQ' = \pi \delta$ indicates the longitude of the perihelion Q' of the orbit of the earth, the angle $\gamma MS' = \pi \breve{\varsigma}$ indicates the longitude of the perihelion S' of the orbit of Mercury. By tracing on the extension of Q'M beyond M the distance $MV' = s^1$, whereby $s^1$ has the aforesaid value, and by describing about V' a circle having a radius R', equal to the aforesaid distance $t^1$, this circle approximately corresponds to the orbit of the earth. By tracing, in addition, on the extension of S'M beyond M the distance $MV^{2'} = s^3$, whereby $s^3$ has the aforesaid value, and by describing about $V^{2'}$ a circle having a radius $R^3$, equal to the aforesaid distance $t^3$, this circle approximately corresponds to the orbit of Mercury, folded into the plane of the ecliptic (in order to make Fig. 4 particularly clear, $t^3$ is assumed to be larger than $R^3$ in Fig. 6). By connecting a point P' on the circle, corresponding to the orbit of the earth, with a point T' on the circle corresponding to the orbit of Mercury, the direction of vision from P' towards T' indicates the direction in which Mercury at the point T' of its orbit is viewed from the earth at the point P' of its orbit, folded into the plane of the ecliptic. When projecting Mercury, the direction of projection should evidently agree with this direction of vision. It is in the interests of a compact structure that the direction, in which Mercury is seen from the earth, is brought about by the viewing from the point of the circle corresponding to the orbit of Mercury towards a point of the circle corresponding to the orbit of the earth, the radius $R'$ of the latter circle being greater than the radius $R^3$ of the circle corresponding to the orbit of Mercury. Let the circle corresponding to the orbit of the earth be displaced by $2s^1$ in the direction $MQ^1$ beyond $Q'$ whereby the centre of this circle is displaced from $V'$ to $V$ and the longitude of the new perihelion $Q$ of the orbit of the earth assumes the value $\pi \delta + 180°$. Let furthermore the circle, corresponding to the orbit of Mercury folded into the plane of the ecliptic, be displaced by $2s^3$ in the direction $MS'$ beyond $S'$, whereby the centre of this circle is displaced from $V^{2\prime}$ to $V^2$ and the longitude of the new perihelion $S$ of the orbit of Mercury assumes the value $\pi \breve{\varphi} +180°$. If then the earth be assumed to be on that displaced circle corresponding to the orbit of the earth at that point $P$, which is at the same distance from the new perihelion $Q$ as the point $P'$ from the first-mentioned perihelion $Q'$, and if furthermore Mercury be assumed to lie on that displaced circle corresponding to the orbit of Mercury at that point $T$, which is at the same distance from the new perihelion $S$ as the point $T'$ from the first-named perihelion $S'$, the direction of vision from $T$ towards $P$ is parallel to the direction of vision from $P'$ towards $T'$ ($P'$ and $P$ lie on a straight line through $M$, and $T'$ and $T$ also lie on a straight line through $M$). The slight parallel displacement which the direction of vision $TP$ has relatively to the direction of vision $P'T'$, is immaterial with a somewhat large diameter of the spherical projection screen. Let further be traced on $VQ'$ a distance $VW=MV=s^1$ and on $V^2 S^1$ a distance $V^2 W^2=MV^2=s^3$.

In view of the assumption that the plane determined by the axis $Y$—$Y$ and the axis of the shaft $d^4$ (vide Fig. 4) contains the direction of vision from the sun towards the vernal equinox, it is necessary that the pivot $f^1, f^2, f^3$, in contrast to the representation in Fig. 4, has such a position relatively to the plate $d^2$ which carries it, that the plane determined by the axes $U$—$U$, $V$—$V$ and $W$—$W$ of the parts of the pivot $f^2, f^3$ and $f^1$ embraces with the said plane the angle $\pi \delta$ and that the position of the axes $U$—$U$, $V$—$V$ and $W$—$W$ corresponds to the position of the points $M$, $V$ and $W$ in Fig. 6. In addition, the pivot $f^7, f^8$ and $f^9$, which also differs from the illustration in Fig. 4, must have such a position relatively to the plate $d^2$ which carries it, that the plane determined by the axes $U^2$—$U^2$, $V^2$—$V^2$ and $W^2$—$W^2$ embraces with that plane, containing the axis $Y$—$Y$ and the axis of the shaft $d^4$, the angle $\pi \breve{\varphi}$ and that the position of the axes $U^2$—$U^2$, $V^2$—$V^2$ and $W^2$—$W^2$ corresponds to the position of the points $M$, $V^2$ and $W^2$ in Fig. 6.

The devices for projecting the planets Venus, Mars, Jupiter and Saturn differ from the device represented in Fig. 4 for the projection of Mercury solely by the fact that for each of them different orbital elements must be considered. As the diameter of the orbit of Venus, just like the diameter of the orbit of Mercury, is smaller than the diameter of the orbit of the earth, the arrangement of the pivot corresponding to the pivot $f^7, f^8, f^9$, in the event of projecting Venus, which is shown by the diagram according to Fig. 6, holds good taking into account the elements of the orbit of Venus. In the event of projecting the planets Mars, Jupiter or Saturn, with which the diameter of the orbit is larger than the diameter of the orbit of the earth, another diagram holds good for the arrangement of the said pivot.

Figure 7:
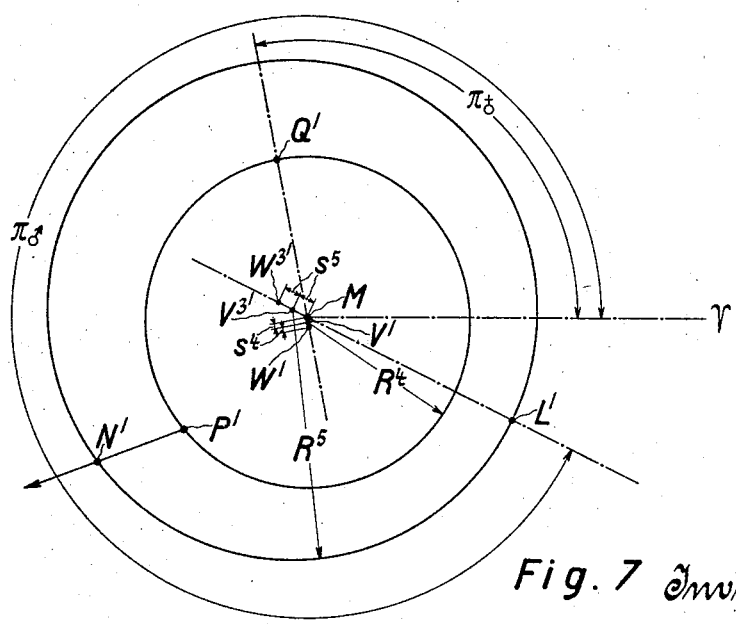

Fig. 7 illustrates this diagram for the arrangement of the pivot with the arrangement for projecting Mars ($\delta$). In this illustration the drawing plane is the plane of the ecliptic. The sun is assumed to be found at the point $M$. $M\gamma$ denotes the direction of vision from the sun towards the vernal equinox. The angle $\gamma MQ'=\pi \delta$ indicates the longitude of the perihelion $Q'$ of the orbit of the earth, the angle $\gamma ML'=\pi \delta$ indicates the longitude of the perihelion $L'$ of the orbit of Mars. Both orbits are assumed as circles and the plane of the orbit of Mars is assumed to be folded into the plane of the ecliptic. $V'$ is the centre of the circle corresponding to the orbit of the earth, the radius of which circle is denoted by $R^4$, $V^{3\prime}$ is the centre of the circle corresponding to the orbit of Mars, the radius of which circle is denoted by $R^5$. Both radii are assumed to be traced on one and the same scale. The point $V'$ lies on the extension of $Q'M$ and has from $M$ a distance $s^4$ which is to the radius $R^4$ as the linear eccentricity is to the radius of the orbit of the earth. The point $V^{3\prime}$ lies on the extension of $L'M$ and has from $M$ a distance $s^5$ which is to the radius $R^5$ as the linear eccentricity is to the radius of the orbit of Mars. A point $W'$ lies on the extension of $Q'V'$ and has from $V'$ a distance $V'W'=MV'=s^4$. A point $W^{3\prime}$ lies on the extension of $L'V^{3\prime}$ and has from $V^{3\prime}$ a distance $V^{3\prime}W^{3\prime}=MV^{3\prime}=s^5$. $P'$ denotes a point of the circle corresponding to the orbit of the earth, $N'$ is a point of the circle corresponding to the orbit of Mars. The direction of vision from $P'$ towards $N'$ indicates the direction in which Mars, being at the point $N'$, is seen from the earth being at the point $P'$, folded into the plane of the ecliptic. When projecting Mars, the direction of projection must agree with this direction of vision.

In order to be able to convert the device, shown in Fig. 4, for projecting Mercury into a device for projecting Mars, the arrangement would have to be made in such a manner that instead of the values $i \; ⚥$, $s^1$, $t^1$, $s^3$, and $t^3$ the values $i \; ♂$, $s^4$, $t^4=R^4$, $s^5$ and $t^5=R^5$ are taken and that the toothed wheel $g^4$ is so coupled to the shaft $d^4$ that, on the shaft $d^4$ and the carrying body $b$ being actuated each by the appertaining motor, the time during which the carrying body $b$ makes a complete rotation about the axis X—X is to the time, during which the toothed wheel $g^4$ makes a complete rotation about its axis of rotation, as a sidereal day is to the sidereal time of revolution of Mars. The pivot corresponding to the pivot $f^1$, $f^2$, $f^3$ should have such a position relatively to the plate $d^2$ which carries it, that the plane determined by the axes of its three parts has the same position relatively to the plane determined by the axis Y—Y and the axis of the shaft as in the device for projecting Mercury. The position of the axes corresponding to the axes U—U, V—V and W—W should correspond to the position of the points M, V' and W' in Fig. 7. The pivot corresponding to the pivot $f^7$, $f^8$, $f^9$ should have such a position relatively to the plate $d^2$ which carries it, that the plane determined by the axes of its three parts embraces with the plane determined by the axis Y—Y and the axis of the shaft $d^4$ the angle $\pi ♂$ and that the position of the axes corresponding to the axes $U^2-U^2$, $V^2-V^2$ and $W^2-W^2$ corresponds to the position of the points M, $V^{3\prime}$ and $W^{3\prime}$ in Fig. 7.

With a view to getting the device ready for use, it is to be set up within a spherical projection screen in such a way that the centre C of the hollow spherical casing $d^1$ lies in the centre of the projection screen and that the axis of rotation X—X of the carrying body $b$ is parallel to the axis of the earth. Thereupon it is necessary to adjust the devices for projecting the sun, the moon and the planets Mercury, Venus, Mars, Jupiter and Saturn in such a manner that the projection apparatus $j^1$ are in the proper position relatively to each other, viz. in such a position that, when projecting these seven stars, the relative position of the images on the projection screen corresponds to the relative position of the stars on the sky at a certain definite moment. Besides, the casing $d^1$ must be adjusted relatively to the carrier containing the eight plates $d^2$ in such a manner that, when simultaneously projecting the fixed star-sky and the said seven stars, the relative position of the images corresponds to the reality at that moment. Thereafter it is necessary to fix the shaft $d$ in the carrying body $b$ in such a way that the position, present at that moment, of the equinoctial line is adjusted in the plane of the ecliptic, which position then holds good with fair approximation for a large space of time (an indicating device requisite for this purpose is, for simplicity, not shown in the drawing). By further adjusting the carrying body $b$ on the stand $a$ in such a manner that the position of the solar image on the projection screen corresponds to the position of the sun at the daytime of the said period on the sky, the device is ready for use.

If the shafts $c$ and $d^4$ be actuated by the appertaining motor, the movement of the stars is demonstrated to the observers looking at the projection screen. The velocity of the movement may be varied at will by disposing countershafts in front of the shafts $c$ and $d^4$, however, in that case nothing must naturally be altered in the proportion of the number of revolutions of the shafts $c$ and $d^4$.

Owing to the finiteness of the diameter of the projection screen the described devices for projecting the bodies of the solar system moved relatively to the earth, which lie more or less outside the centre of the projection screen coinciding with the point C, cannot act entirely without fault. However, the fault can almost entirely be obviated if each of the projection apparatus $j^1$ be adjustably disposed relatively to the guide-bars $j^6$ and $m^6$ respectively. The adjustment would have to be made in such a manner that the optical axis of each projection apparatus is directed with a certain definite position of the latter to that point of the projection screen to which it ought to be directed in the case of a centric arrangement of the respective device.

I claim:

1. Device for projecting the fixed stars, containing a pedestal body, a plurality of projecting apparatus, each of which comprises an optical system and an image of a part of the fixed stars which optical systems and images are so disposed that the projected images adjoin each other corresponding to the natural aspect, the said apparatus being rigidly connected together and supported on the said body rotatably about a common axis, and a single source of light lying on this axis, all the said optical systems being adapted to receive light emanated from this source of light, and means for rotating the said projecting apparatus about the said axis.

2. In a device for projecting the motion of a member of the solar system, moved relatively to the earth, a pedestal body, a carrier supported rotatably on this body, two members fitted to this carrier, these members being movable relatively to each other in such a way that the one of these two members describes a closed orbit about the other, a projecting apparatus containing a source of light and an optical system, means for so coupling this apparatus and the said two members, that the optical axis of this apparatus passes through the said two members, means for rotating the said carrier, and other means adapted to impart to the said two members a movement relatively to each other.

3. In a device for projecting the motion of a member of the solar system, moved relatively to the earth, a pedestal body, a carrier supported rotatably on this body, two members fitted to this carrier, these members being movable relatively to each other, means for guiding at least one of these members on a circle, the centre of which lies outside a straight line intersecting the axis of rotation of the said carrier by an angle of about 23½°, a projecting apparatus containing a source of light and an optical system, means for so coupling this apparatus and the said two members that the optical axis of this apparatus passes through the said two members, means for rotating the said carrier, and other means adapted to impart to the said two members a movement relatively to each other.

4. In a device for projecting the motion of a member of the solar system, moved relatively to the earth, a pedestal body, a carrier supported rotatably on this body, two members fitted to this carrier, these members being movable relatively to each other, means for guiding each of these two members on a circle, these circles being of different size and the centres of the same lying outside a straight line intersecting the axis of rotation of the said carrier by an angle of about 23½°, a projecting apparatus containing a source of light and an optical system, means for so coupling this apparatus and the said two members that the optical axis of this apparatus passes through the said two members, means for rotating the said carrier, and other means adapted to impart to each of the said two members a movement on the circle pertaining to it.

5. In a device for projecting the motion of a member of the solar system, moved relatively to the earth, a pedestal body, a carrier supported rotatably on this body, two members fitted to this carrier, these members being movable relatively to each other, means for guiding each of these two members on a circle, these circles being of different size and the centres of the same lying outside a straight line intersecting the axis of rotation of the said carrier by an angle of about 23½°, a projecting apparatus containing a source of light and an optical system, means for so coupling this apparatus and the said two members that the optical axis of this apparatus passes through the said two members, means for rotating the said carrier, and other means adapted to impart to each of the said two members a movement on the circle pertaining to it, the planes of the said two circles forming an angle with each other equal to that angle which the orbit of the member of the solar system to be represented forms with the ecliptic.

6. Device according to claim 5, the guiding means of one of the said members being rotatable about the said straight line.

7. Device according to claim 5, the guiding means of one of the said members being rotatable about an axis perpendicular to the plane of the appertaining circle and passing through the point of intersection of this plane and the said straight line.

8. In a device for projecting the motion of a member of the solar system, moved relatively to the earth, a pedestal body, a carrier supported rotatably on this body, two members fitted to this carrier, these members being movable relatively to each other, means for guiding at least one of these members on a circle, the centre of which lies outside a straight line intersecting the axis of rotation of the said carrier by an angle of about 23½°, a link disposed on the said carrier rotatably about an axis perpendicular to the plane of the said circle in that point in which this plane is intersected by the said straight line, which link contains a radial slit, an arm disposed on the said carrier rotatably about an axis passing through the centre of the said circle, a pivot connected to this arm and engaging the said slit, means for coupling this arm and the member guided on the said circle, a driving wheel rotatably disposed on the said carrier, a second pivot connected with this wheel and engaging the said slit, the distance of the first named pivot from the axis of rotation of the arm being equal to the distance of the second named pivot from the axis of rotation of the said wheel, the axis of rotation of the arm being parallel to the axes of rotation of the link and the wheel and lying in the plane containing these two axes in the middle of these two axes, a projecting apparatus containing a source of light and an optical system, means for so coupling this apparatus and the said two members that the optical axis of this apparatus passes through the said two members, means for rotating the said carrier, other means adapted to impart to the said two members a movement relatively to each other, and means for rotating the said driving wheel.

9. In a device for projecting the motion of a member of the solar system, moved relatively to the earth, a pedestal body, a carrier supported rotatably on this body, two members fitted to this carrier, these members being movable relatively to each other, means for guiding each of these two members on a circle, these circles being of different size and the centres of the same lying outside a straight line intersecting the axis of rotation of the said carrier by an angle of about 23½°, a projecting apparatus containing a source of light and an optical system, means for so coupling this apparatus and the said two members that the optical axis of this apparatus passes through the said two members, the source of light lying at that end of the optical axis which faces the member guided on the smaller circle, means for rotating the said carrier, and other means adapted to impart to each of the said two members a movement on the circle pertaining to it.

WALTHER BAUERSFELD.